United States Patent Office 3,313,456
Patented Apr. 11, 1967

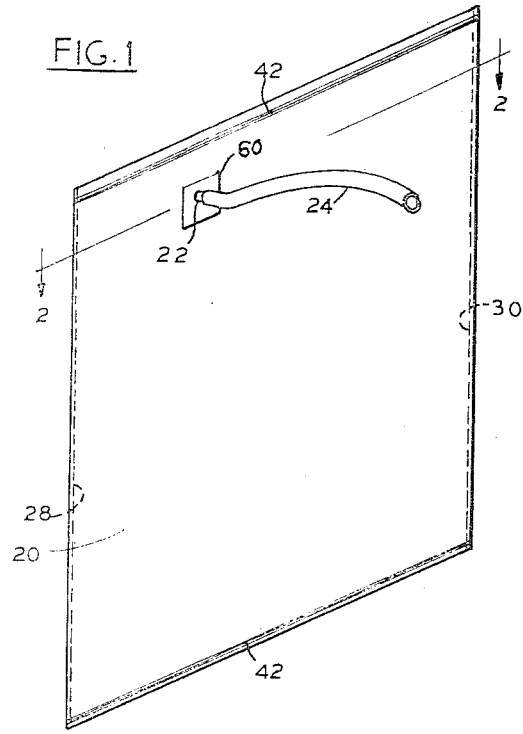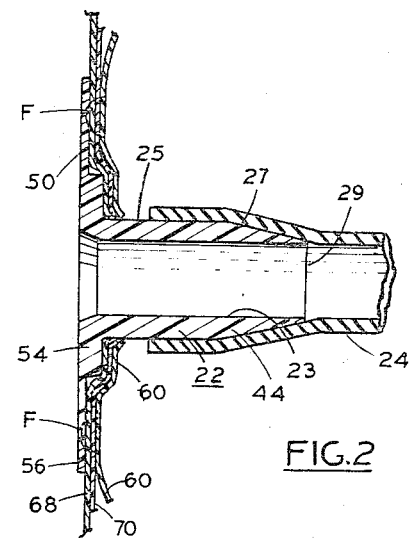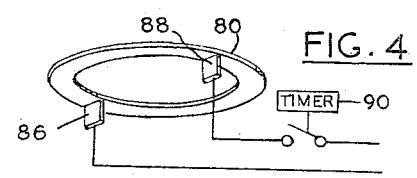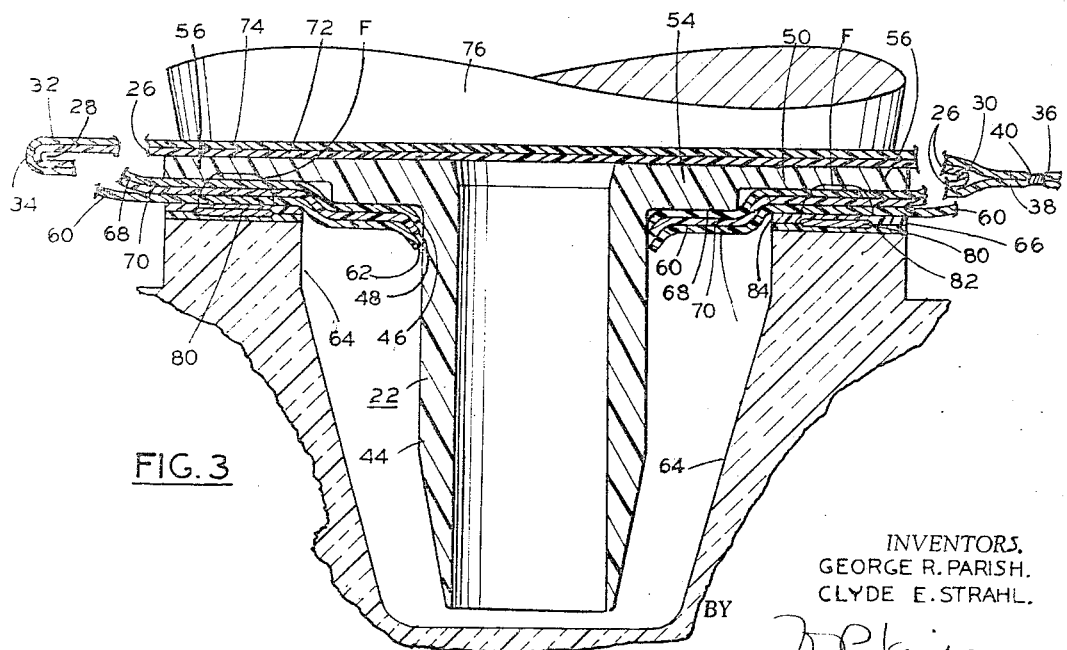
FIG. 1
FIG. 2
FIG. 4
FIG. 3
INVENTORS.
GEORGE R. PARISH.
CLYDE E. STRAHL.
BY
ATTORNEY

3,313,456
LINER BAGS
George R. Parish, Indianapolis, and Clyde E. Strahl, Greenfield, Ind., assignors to Inland Container Corporation, Indianapolis, Ind., a corporation of Indiana
Continuation of application Ser. No. 393,579, Sept. 1, 1964. This application June 27, 1966, Ser. No. 560,983
6 Claims. (Cl. 222—107)

This application is a continuation of application No. 393,579, filed Sept. 1, 1964, by the same applicants, now abandoned.

This invention relates to liner bags for use within supporting fiberboard cartons and the like, in the filling, transport and dispensing of liquids.

In U.S. Patent #3,007,608 there is disclosed liner bags of polyethylene or other thin walled thermoplastic material for use within supporting containers such as milk cans, or corrugated fiberboard boxes. The liner bags are provided with a dispensing hose, which is secured to the liner bag by mechanical banding means. A similar construction is disclosed in U.S. Patent #3,122,297 wherein the liner bag comprises several plies. The thickness of the polyethylene employed in such liners may be in the order of .0015 inch per ply where several plies are used, or .002 to .003 inch thick for a single ply. The liners may be formed of sections of tubular stock, or sheet stock, or combinations thereof and it is common practice to complete the bag by heat sealing along the top and bottom, and also along the side edges as desired.

The present invention is directed to the application to such a bag, of a flanged thermoplastic nipple or fitting to which a filling and dispensing hose may be attached. The invention further has to do with the means of attaching the flange of such a fitting to the thin liner material, as well as the shape of the hollow stem of the nipple or filling, whereby the application of a rubber hose thereto and the retention of the hose thereon is facilitated. More particularly the invention is directed to a method of heat sealing the relatively thick thermoplastic flange of such a fitting to the thin wall material of the liner, whether single ply or multiply, through the use of an additional thin layer of the liner material, whereby the close tolerances heretofore requisite to provide a reliable and uniform annular seal is avoided, and whereby a reliable seal with adequate strength may be effected with speed utilizing commercially available heat sealing equipment. Further the invention is directed to exterior shape of the hollow stem of the nipple, the same being so tapered, as to be capable of receiving a section of rubber or resilient plastic tubing having an internal bore close to that of the bore of the hollow stem.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 1 is a perspective view of a liner bag having a fitting with hose attached to the bag;

FIGURE 2 is an enlarged broken sectional view through the bag, fitting and hose attachment, taken substantially on the line 2—2;

FIGURE 3 is an enlarged sectional fragmentary view of the bag and fitting, and indicating diagrammatically the opposed elements of heat sealing apparatus; and FIGURE 4 is a perspective view from beneath of a resistance heating element and electrical circuit.

Referring to the drawings there is shown a multiply liner bag 20, having affixed thereto a flanged nipple 22 or fitting to which is attached a length of hose 24 of rubber or other suitable resilient plastic material. The bag may comprise an inner ply 26 in the form of a flattened section of tubular plastic with side folds 28 and 30, and the outer ply may be a sheet 32 folded as at 34 around one side edge fold 28 of the inner tubular ply, with the side edges 36 and 38 heat sealed together adjacent to but beyond the other side edge fold 30 of the tubular ply, as at 40.

All four thicknesses of the two plies may be heat sealed transversely across one end of the sections as at 42, and after projecting the tubular nipple or stem portion 44 of the flanged nipple through apertures 46 and 48 in the two plies of one of the side walls from the inside, so as to locate the flange 50 of the fitting or nipple 22 internally of the tubular ply 26, the four thicknesses of the two plies may be heat sealed transversely across the other end of the sections as at 42, to seal the bag except for the nipple and the apertures 46 and 48 through which the nipple stem 44 projects.

The hollow stem of the nipple has a relatively smooth cylindrical bore 23, and an exterior cylindrical surface leading away from the flange 50 as indicated at 25. The cylindrical exterior surface of the stem merges with a conical tapered surface 27 which extends to the outer end of the stem, leaving a relatively thin annular end wall 29. The stem, so shaped, facilitates the application thereto of a section of rubber hose 24 having an internal diameter substantially corresponding to the internal diameter of the stem, the hose being readily stretched over the tapered end and cylindrical portion when applied, without danger of collapsing the stem. By providing the tapered end, which reduces in diameter substantially to that of the internal diameter, and employing a taper of about 10 degrees from the axis, the application of a length of hose having an internal diameter corresponding to that of the fitting bore, to the fitting is facilitated. On applying the hose end so that a substantial portion of the hose extends over the cylindrical portion, a friction fit capable of withstanding any tendency to blow off, when filling the liner results. In this respect, the ability to employ a hose, whose internal diameter is substantially that of the internal diameter of the stem bore, minimizes axial thrust which might tend to cause the hose to blow off during the filling, due to the absence of any constriction. Since the flow velocity of liquid through the hose and through the nipple bore is essentially the same, substantially no static pressure is created by flow at the end of the stem. It is thus unnecessary to provide annular ribs or teeth on the exterior of the stem to increase the friction grip of the hose, and the friction grip is sufficient to hold the tube on the stem without external banding, or the use of adhesives and the like. Since annular ribs or teeth are avoided, the rubber tube is not overstressed thereby.

The flange 50 of the fitting 22 had an annular relatively thick central portion 54, and a thinner flexible surrounding annular portion 56. It will be understood that the thickness of each of the individual plies 28 and 32 may be in the order of .0015 inch, whereas the thickness of the thin flexible annular flange portion 56, may be approximately ten times such thickness. It will be appreciated that any annular ring of fusion between the two such thin films and the annular portion 56 of the relatively thick flange 50, must of necessity be uniform, if the seal effected thereby is to be reliable, liquid tight, and securely bond the plies to the fitting flange. The application of the correct amount of heat to effect fusion of thin films with a substantially thicker member has presented difficulties in that any slight variation in heating effect results in severe overheating, or under heating and imperfect bonding.

In order to effect the annular seal of the films to the fitting flange, without the danger of spoilage due to overheat or underheat or minor variations in heat along the annular length of the seal, which might cause weak spots, the present invention contemplates the application of the heat to effect the seal through a third ply of material having similar characteristics to the plies 26 and 32. In practice such third ply, indicated at 60, may be a small section of waste material and of square, round or other suitable shape and of a size to completely encompass the annular seal so that its marginal edge will lie outwardly of the seal and the edge be free of attachment to the side panel, except in the seal area, and of a thickness corresponding to that of the plies 26 and 32 or greater. The third ply is provided with an aperture 62, that is threaded over the stem 48 of the nipple 22. With the additional ply 60 in position, the stem of the nipple is projected into a central aperture 64 of an annular heat fusion element 66, which element 66 supports the ply 60, the thicknesses 68 and 70 of the plies 26 and 32, the annular portion 56 of the flange 50, the thicknesses 72 and 74 of the plies 26 and 32, and a pressure element 76 having a flat pressure face 78.

The heat fusion element 66 comprises an annulus of thin sheet nichrome 80, of uniform radial width and uniform thickness. Such annulus is sandwiched between thin sheets of Teflon impregnated fiberglass cloth such as 82 and 84. Heating current may be applied to the nichrome annulus at exactly diametrically opposed points through leads 86 and 88, which may be silver soldered to the underside thereof. Electrical resistance heating of the annulus is controlled by a timer switch 90 which provides a fixed period for current flow, to thereby control the heating of the thermoplastic plies and the fitting flange. The application of heat to the plies fuses an annular area of the plies 60, 68 and 70 and an annular shallow surface area of the outer annular portion 56 of the fitting flange 50, while the various thicknesses are held under pressure. The portion of the plies radially inward, and radially outward of the fused area remain cool and form together with the unfused portion of the flange, a confining wall around the annular fused area, and as quickly as fusion is effected, the heating current is cut off, and the heat of the fused thermoplastic dissipated, whereupon the fused thermoplastic returns to the solid state as a homogeneous annular mass to form a seal and bond between the fitting flange and the plies 60, 68 and 70. While the ply 60 may be subjected to a somewhat higher heat than the other plies, because of being immediately adjacent to the nichrome annulus, the bond between it and the adjacent ply 68 need not be uniformly perfect and of high strength. Since the ply 60 in relation to the fitting or the plies 68 and 70 of the liner bag is not subjected to stress, no harm can result thereby. Yet by employing the ply 60 in the manner set forth, a perfect and uniform bond between the plies 68, 70 and flange 56 results.

It will be understood that the fusion temperature of the thermoplastic of the plies 60, 68 and 70, and fitting flange is well below the fusion temperature of the Teflon impregnated fiberglass sheet 82, and, thus there is no tendency of the fused area to in any way adhere to the Teflon covered heating element.

The actual fusion may be effected in a fraction of a second, and the heat dissipation necessary to restore the solid state is effected in but a few seconds, so that the overall cycle for effecting a seal is but a matter of seconds.

In the packaging of milk where sanitation standards must be met, once the liner has been provided with a fitting and the liner sealed under sanitary conditions it is relatively easy to fuse the fitting to the bag under sanitary conditions, and to thereafter apply one end of a section of hose sealed at its other end, to the stem of the nipple while preserving the sanitary condition within the liner.

Such a liner when placed within a supporting container structure such as a carton or milk can, may be caused to fill out into supporting relation with the inside walls of the container, as the liner is rapidly filled under pressure by means of the hose and fitting, and such filling may be accomplished by apparatus such as is disclosed in U.S. Patent #3,108,901.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

We claim:

1. A liner bag of thin thermoplastic sheet material having a flanged fitting heat sealed thereto, said bag comprising a multiply side panel forming an integral part of the bag of thin thermoplastic films, said multiply panel films having aligned apertures therein, a fitting of thermoplastic material having a hollow tubular stem projecting through and closely fitting said apertures, and having an annular attachment flange integral with said stem of a thickness substantially greater than said side panel films, said attachment flange being disposed against one side of the inner ply of said panel, an auxiliary section of thin thermoplastic film having a central aperture therein threaded over the stem of said fitting and having an area at least as great as the area of said flange and disposed on the opposite side of the outer ply of said panel and having its marginal edge free of attachment to the side panel, and an annular heat seal bonding said flange, panel plies and section together, in an homogeneous continuous annulus of thermoplastic extending through the entire thickness of said film section, said panel plies and partially into the thickness of said fitting flange, said annulus being disposed radially inward of the outer edge of said fitting flange, and the marginal edge of the auxiliary section.

2. A liner bag of thin thermoplastic sheet material having a flanged fitting heat sealed thereto, said bag comprising a side panel forming an integral part of the bag of thin thermoplastic film, said panel having a small aperture therein, a fitting of thermoplastic material having a hollow tubular stem, projecting through and closely fitting said aperture, and having an annular attachment flange integral with said stem of a thickness substantially greater than said side panel film, said attachment flange being disposed against one side of said panel, an auxiliary section of thermoplastic film having a central aperture therein and threaded over the stem of said fitting, said section having an area at least as great as the area of said flange and disposed on the opposite side of said panel and having its marginal edge free of attachment to the side panel, and an annular heat seal bonding said flange, panel and section together, in an homogeneous continuous annulus of thermoplastic extending through the entire thickness of said film section, said panel and partially into the thickness of said fitting, flange, said annulus being disposed radially inward of the outer edge of said fitting flange, and the marginal edge of the auxiliary section.

3. A liner bag in accordance with claim 1, wherein the tubular stem of the fitting over a portion of its length adjacent the attachment flange end has a circumferentially continuous substantially cylindrical external wall and has, over the remaining portion of its length adjacent the other end, a tapering wall merging with said cylindrical wall, said tapering wall gradually reducing in diameter to the end of the stem, and a length of elastic hose having an unstressed internal diameter approximately that of the diameter of the bore of said stem and having an end elastically stretched over the tapering wall and a portion of the cylindrical wall of the stem.

4. A liner bag in accordance with claim 2, wherein the tubular stem of the fitting over a portion of its length adjacent the attachment flange end has a circumferentially continuous substantially cylindrical external wall and has, over the remaining portion of its length adjacent the other end, a tapering wall merging with said cylindrical wall, said tapering wall gradually reducing in diameter to the end of the stem, and a length of elastic hose having an unstressed internal diameter approximately that of the diameter of the bore of said stem and having an end elastically stretched over the tapering wall and a portion of the cylindrical wall of the stem.

5. A liner bag of thin thermoplastic sheet material having a flanged fitting heat sealed thereto, said bag comprising a multiply side panel forming an integral part of the bag of thin thermoplastic films, said multiply panel films having aligned apertures therein, a fitting of thermoplastic material having a hollow tubular stem projecting through and closely fitting said apertures, and having an annular attachment flange integral with said stem of a thickness substantially greater than said side panel films, said attachment flange being disposed against the inside surface of the inner ply of said panel, and an annular heat seal bonding said flange, and panel plies together, in an homogeneous continuous annulus of thermoplastic extending through the entire thickness of said panel plies and partially into the thickness of said fitting flange, said annulus being disposed radially inward of the outer edge of said fitting flange.

6. A liner bag in accordance with claim 5, wherein the tubular stem of the fitting over a portion of its length adjacent the attachment flange end has a substantially cylindrical external wall and has, over the remaining portion of its length adjacent the other end, a tapering wall merging with said cylindrical wall, said tapering wall gradually reducing in diameter to the end of the stem, and a length of elastic hose having an unstressed internal diameter approximately that of the diameter of the bore of said stem and having an end elastically stretched over the tapering wall and a portion of the cylindrical wall of the stem.

No references cited.

ROBERT B. REEVES, *Primary Examiner.*

HADD S. LANE, *Assistant Examiner.*